US010908309B2

(12) United States Patent
Xia

(10) Patent No.: US 10,908,309 B2
(45) Date of Patent: Feb. 2, 2021

(54) ESTIMATING INTERVAL ANISOTROPY PARAMETER FOR PRE-STACK DEPTH MIGRATION USING A LEAST-SQUARES METHOD

(71) Applicant: Landmark Graphics Corporation, Houston, TX (US)

(72) Inventor: Fan Xia, Katy, TX (US)

(73) Assignee: Landmark Graphics Corporation, Houston, TX (US)

( * ) Notice: Subject to any disclaimer, the term of this patent is extended or adjusted under 35 U.S.C. 154(b) by 52 days.

(21) Appl. No.: 15/567,122

(22) PCT Filed: Oct. 25, 2016

(86) PCT No.: PCT/US2016/058692
§ 371 (c)(1),
(2) Date: Oct. 17, 2017

(87) PCT Pub. No.: WO2018/080460
PCT Pub. Date: May 3, 2018

(65) Prior Publication Data
US 2019/0235113 A1 Aug. 1, 2019

(51) Int. Cl.
*G01V 1/36* (2006.01)
*G01V 1/28* (2006.01)
*G01V 1/30* (2006.01)

(52) U.S. Cl.
CPC ............. *G01V 1/362* (2013.01); *G01V 1/28* (2013.01); *G01V 1/282* (2013.01); *G01V 1/30* (2013.01); *G01V 2210/512* (2013.01); *G01V 2210/52* (2013.01); *G01V 2210/614* (2013.01); *G01V 2210/626* (2013.01)

(58) Field of Classification Search
CPC .. G01V 1/362; G01V 1/282; G01V 2210/512; G01V 2210/52; G01V 2210/614; G01V 2210/626
See application file for complete search history.

(56) References Cited

U.S. PATENT DOCUMENTS 6,067,275 A    5/2000 Sayers
2002/0049540 A1* 4/2002 Bevc et al.
(Continued)

FOREIGN PATENT DOCUMENTS

WO    2015145257 A2    10/2015

*Primary Examiner* — Regis J Betsch
*Assistant Examiner* — Jeremy A Delozier
(74) *Attorney, Agent, or Firm* — Tenley Krueger; Parker Justiss, P.C.

(57) ABSTRACT

An apparatus and a method for estimating interval anellipticity parameter by inversing effective anellipticity parameter in the depth domain using a least-squares method. One embodiment of interval anellipticity parameter estimator includes: 1) an interface configured to receive seismic data and borehole information; 2) a depth convertor configured to obtain a function of depth of effective anisotropy parameter based on said borehole information; 3) an inverse transformer configured to set up said function of depth of effective anisotropy parameter as a least-squares fitting problem based on said P-wave data; and 4) an iterative solver configured to use iterative methods to solve said least-squares fitting problem and to obtain an anisotropy model containing interval anellipticity parameter.

14 Claims, 4 Drawing Sheets

(56) References Cited

U.S. PATENT DOCUMENTS

| | | |
|---|---|---|
| 2003/0151976 A1* | 8/2003 | Leaney |
| 2004/0008578 A1 | 1/2004 | Leaney |
| 2010/0133010 A1* | 6/2010 | Blias .................. G01V 1/42 |
| | | 175/50 |
| 2010/0135115 A1* | 6/2010 | Sun .................... G01V 1/303 |
| | | 367/75 |
| 2011/0292765 A1 | 12/2011 | Siliqi |
| 2018/0335533 A1* | 11/2018 | Xia .................... G01V 1/40 |

\* cited by examiner

ESTIMATING INTERVAL ANISOTROPY PARAMETER FOR PRE-STACK DEPTH MIGRATION USING A LEAST-SQUARES METHOD

CROSS-REFERENCE TO RELATED APPLICATION

This application is the National Stage of, and therefore claims the benefit of, International Application No. PCT/US2016/058692 filed on Oct. 25, 2016, entitled "ESTIMATING INTERVAL ANISOTROPY PARAMETER FOR PRE-STACK DEPTH MIGRATION USING A LEAST-SQUARES METHOD," and has a priority date of Oct. 25, 2016, based on application PCT/US2016/058692. The above application is commonly assigned with this National Stage application and is incorporated herein by reference in its entirety.

BACKGROUND

Certain earth formations exhibit a property called "anisotropy", where the velocity of acoustic waves polarized in one direction may be somewhat different than the velocity of acoustic waves polarized in a different direction within the same earth formation. Anisotropy may arise from intrinsic structural properties, such as grain alignment, crystallization, aligned fractures, or from unequal stresses within the formation.

In the presence of seismic anisotropy, conventional primary wave (P-wave) data processing based on the assumption of isotropy typically results in errors in depth images and interpretations. A transversely isotropic model with a vertical symmetry axis (VTI) represents one of the most effective approximations to the subsurface formations and has been widely applied to anisotropic pre-stack depth migration (PSDM) over the past several decades; knowledge of a vertical velocity and two Thomsen parameters is essential to produce accurate depth images of P-wave data.

For VTI media, one critical step in correcting for anisotropy in PSDM is the estimation of reliable interval anisotropy parameters in depth domain from P-wave data combined with borehole and other non-seismic information. Despite recent successes, anisotropy parameter estimation in depth domain remains a highly challenging and unsolved problem. In recent years, many approaches to invert for interval VTI anisotropy, specifically the interval anellipticity parameter η, have been developed in reflection seismology. Most of these methods were implemented in the time domain using Dix-type inversion, and a time-to-depth conversion based on 1D approximation was then applied to obtain an interval anellipticity parameter for anisotropic PSDM. The interval anellipticity parameter can be refined in the depth-migrated domain using advanced reflection tomography or wave-equation migration velocity analysis for complex geological environments.

BRIEF DESCRIPTION

Reference is now made to the following descriptions taken in conjunction with the accompanying drawings, in which.

DETAILED DESCRIPTION

The Dix-type equation noted above analytically inverts effective anellipticity parameter for interval anellipticity parameter as a function of vertical travel time. It is realized herein that traditional Dix-type inversion is known to be an ill-posed inverse problem, even under the assumption of horizontally layered geological environments. For a thin interval, small errors in the effective anellipticity parameters could have a dramatic effect on the estimated interval anellipticity parameter. It is desirable to find a stable and inexpensive estimate of interval anisotropy parameter at the early stages of parameter inversion for seismic anisotropy.

Accordingly, the disclosure provides an apparatus and methods that accurately estimate the interval annellipticity parameter in the depth domain.

This disclosure provides a more accurate Dix-type equation and its explicit inverse in the depth domain that directly inverts effective anellipticity parameter for interval anellipticity parameter as a function of depth. A robust and effective least-squares method is developed to invert directly the effective values of anellipticity parameter for interval values in depth domain, i.e., the input data and output data for the proposed Dix-type inversion are both in depth domain. In addition, a prior knowledge of interval normal moveout (NMO) velocities obtained from an isotropic tomography using the near-offset P-wave data helps stabilize and constrain the solution of the proposed least-squares method. Moreover, this disclosure inverts the interval anellipticity parameter in the depth domain which presents the data processor with a stable initial parameter for anisotropic depth migration. Thus, this disclosure establishes a more robust approach than simply estimating starting parameters for anisotropic velocity model building.

Figure 1:
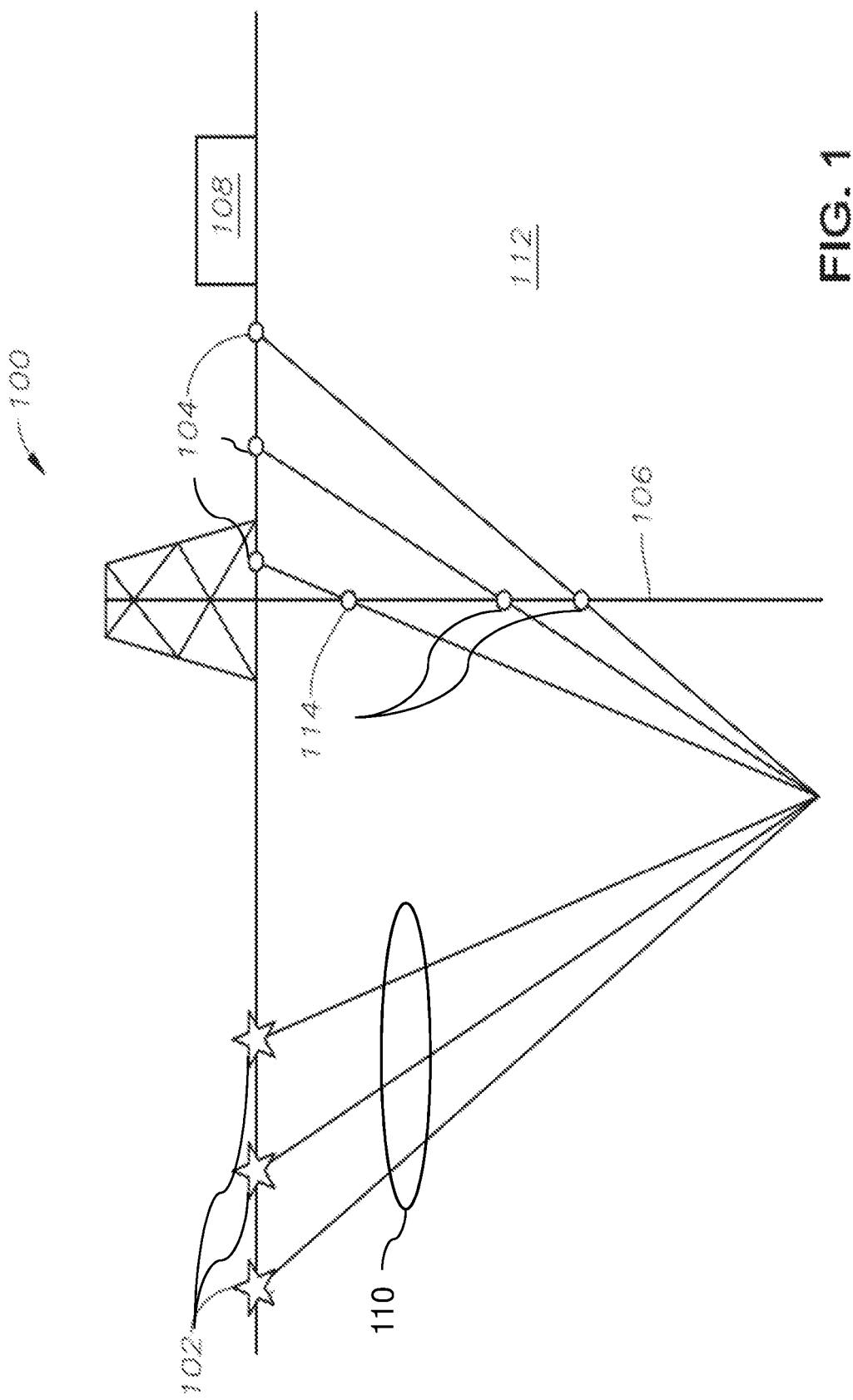
FIG. 1 is a schematic diagram showing a cross-sectional view of an illustrative environment with seismic sources, seismic receivers, a wellbore and a computing system, according to certain embodiments of the present disclosure.

FIG. 1 is a schematic diagram showing a cross-sectional view of an illustrative environment 100 with seismic sources 102, seismic receivers at the surface 104, a wellbore 106, a computing system 108, and seismic receivers in the wellbore 114 according to certain illustrative embodiments of the present disclosure. An energy (e.g. acoustic wave)110 from one or more of the seismic sources 102 at or near the surface travels through subterranean formation 112, reflects off of various subterranean formations or geological features, and is subsequently collected as seismic data at the surface using the surface receivers 104 or within the wellbore 106 using wellbore receivers 114. For certain embodiments, the subterranean formation 112 can be anisotropic, i.e., propagation speed of acoustic waves may depend on the direction in which the acoustic wave propagates.

The computing system 108 may be configured to acquire seismic data associated with the subterranean formation 112 from the surface receivers 104 or the wellbore receivers 114, and perform estimation of anisotropy parameters of the subterranean formation 112 as disclosed herein and discussed in further detail below. For example, the seismic data can include P-wave data from which a measured effective anellipticity parameter can be extracted and an estimated interval anellipticity parameter can be determined in depth domain.

In one or more embodiments, the computing system 108 may be further configured to utilize the estimated anisotropy parameters of the subterranean formation 112 and perform anisotropy PSDM and anisotropy migration velocity analysis (MVA) providing coherent depth images and an accurate seismic data volume associated with the subterranean formation 112. For some embodiments, the obtained coherent depth images and the accurate seismic data volume of the subterranean formation 112 obtained by taking into account anisotropy parameters of the subterranean formation 112 may be utilized in real time for drilling of the wellbore 106. In general, the presented method for estimation of anisotropy parameters of subterranean formations may be applied for obtaining more coherent depth images of hydrocarbon reservoirs in the subterranean formation leading to more efficient drilling of wellbores and increased hydrocarbon production.

Figure 2:
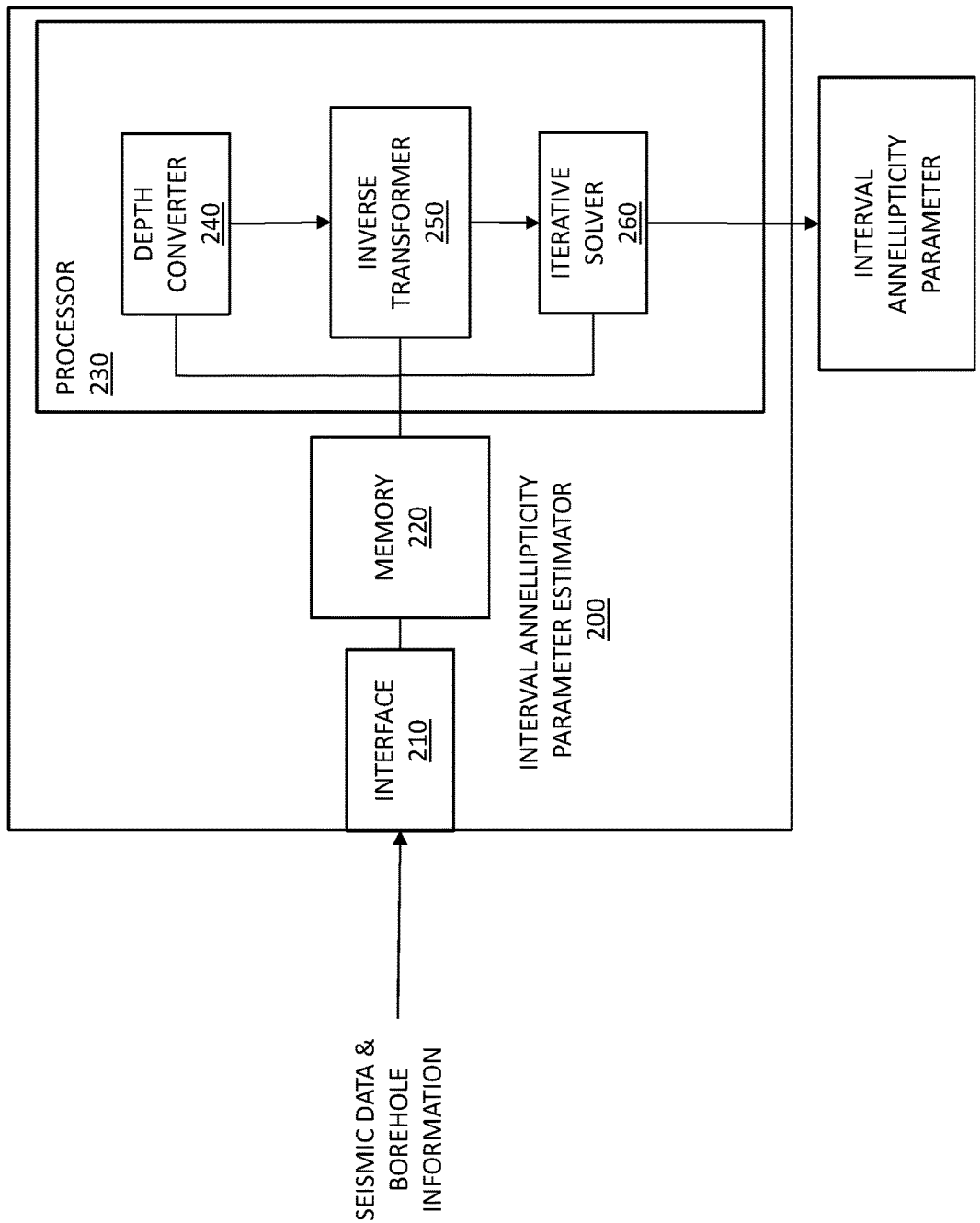
FIG. 2 is a block diagram of an apparatus for estimating interval anisotropy parameter according to certain embodiments of the present disclosure.

FIG. 2 illustrates a block diagram of an interval anellipticity parameter estimator 200 that estimates an interval anellipticity parameter according to the principles of the disclosure. The interval anellipticity parameter estimator 200 can be implemented on a computer, such as the computing system 108 illustrated in FIG. 1. The interval anellipticity parameter estimator 200 includes an interface 210, a memory 220, and a processor 230. The interface 210, the memory 220 and the processor 230 can be connected together via conventional means.

The interface 210 is configured to receive seismic data, borehole information and other non-seismic data for the anellipticity parameter estimator 200. The interface 210 can be a conventional interface that is used to receive and transmit data. The interface 210 can include multiple ports, terminals or connectors for receiving or transmitting the data. The ports, terminals or connectors may be conventional receptacles for communicating data via a communications network. The seismic data includes P-wave data, from which measured effective anellipticity parameter can be extracted. In addition, a prior knowledge of interval NMO velocities can be obtained from an isotropic tomography using the near-offset P-wave data. The borehole information may be used to extract vertical information, such as vertical velocity and vertical travel time.

The memory 220 may be a conventional memory that is constructed to store data and computer programs. The memory 220 includes a data reservoir configured to store data needed for the anellipticity parameter estimator 200. The memory 220 may store operating instructions to direct the operation of the processor 230 when initiated thereby. The operating instructions may correspond to algorithms that provide the functionality of the operating schemes disclosed herein. For example, the operating instructions may correspond to the algorithm or algorithms that convert a Dix-type equation into depth domain. In one embodiment, the memory 220 or at least a portion thereof is a non-volatile memory.

The processor 230 is configured to determine an interval anellipticity parameter. The processor 230 includes a depth converter 240, an inverse transformer 250 and an iterative solver 260. In one embodiment, the memory 220 or a portion thereof can be part of the processor 230.

The depth convertor 240 is configured to convert a function of effective anellipticity parameter into depth domain based on the vertical information extracted from the borehole information. In one embodiment, the function of effective anellipticity parameter in depth domain is a Dix-type equation that states the linear relationship between an effective anellipticity parameter and an interval anellipticity parameter.

The effective anellipticity parameter in the depth domain is approximately given by the following Dix-type equation:

$$\bar{\eta}(z) = \frac{1}{8}\left\{\frac{1}{t_0(z)\bar{V}_{nmo}^4(z)}\int_0^z \frac{V_{nmo}^4(\zeta)}{V_{P0}(\zeta)}[1+8\eta(\zeta)]d\zeta - 1\right\}. \quad \text{Eq. 1}$$

From equation 1, $t_0$ is the vertical travel time calculation from the vertical velocity obtained from the borehole information, $V_{nmo}$ is the interval normal moveout velocity, $V_{PO}$ is the vertical velocity and z and $\zeta$ are the depth, respectively. Next, the inverse transformer 250 is configured to set up a rearranged Dix-type equation in depth domain as a least-squares fitting problem based on the measured effective anellipticity parameter obtained from the P-wave seismic data. For example, the effective anellipticity parameter can be estimated by analyzing the residual moveout on isotropic depth-migrated common image gathered after the application of an isotropic tomography using P-wave seismic data.

In order to invert for the interval anellipticity parameter η, Eq. 1 can be rearranged to:

$$1 + 8\bar{\eta}(z) = \frac{1}{t_0(z)\bar{V}_{nmo}^4(z)}\int_0^z \frac{V_{nmo}^4(\zeta)}{V_{P0}(\zeta)}[1+8\eta(\zeta)]d\zeta. \quad \text{Eq. 2}$$

In one embodiment, for stratified VTI media composed of regularly spaced horizontal layers, equation 2 can be set up in a least-squares fitting goal:

$$d = WFm + e, \quad \text{Eq. 3}$$

where d is the known data computed from the measured effective anellipticity parameter, m is the model containing interval anellipticity parameter to be inverted for, e is an error vector, F is the smoothing operator like causal integration that is scaled by the term $V_{nmo}^4/V_{PO}$ in equation 2, and W is the data weighting function computed from the term $1/t_0 V_{nmo}^4$ in equation 2.

The inverse problem (Eq. 3) can be solved in a least-squares sense by taking the model that minimizes an objective function ψ, defined by equation 4 below for the covariance matrices $C_e$ and $C_m$:

$$\Psi(m) = (d - WFm)^T C_e^{-1}(d - WFm) + m^T C_m^{-1} m, \quad \text{Eq. 4}$$

The positive-definite matrix $C_e$ plays the role of the variance of the error vector e. The second term of ψ defines a stabilizing functional on the model space. In practice, an inverse covariance matrix $C_e^{-1}$ relates to the data residual weighting operator multiplied by its adjoint and an inverse covariance matrix $C_m^{-1}$ relates to the roughening operator, for example, second-difference operator, multiplied by its adjoint.

The iterative solver 260 is configured to employ iterative methods to solve the least-squares fitting problem (Eq. 4) for an anisotropy model containing an interval anellipticity parameter. The number of iterations needed depends on the initial model and the final goal. Applicable iterative methods include conjugate-gradients, Gaussian-Newton, LSQR (Least squares with QR factorization), etc.

In one embodiment, the iterative solver 260 employs a method of conjugate-gradients (CG) for minimizing the objective function ψ. The gradient in the CG method is the gradient of the objective function ψ and is determined by taking the derivative of the objective function ψ with respect to the model.

For certain embodiments, the iterative solver 260 is configured to apply a prior knowledge of interval normal moveout velocity obtained from an isotropic tomography as constraints of the anisotropy model. Additional constraints contribute to the fast convergence in inversion process: preconditioning by parameterizing model with a smooth, bounded function and regularization with geological constraints. The iterative solver 260 is configured to output an anisotropy model which contains the interval anellipticity parameter.

Figure 3:
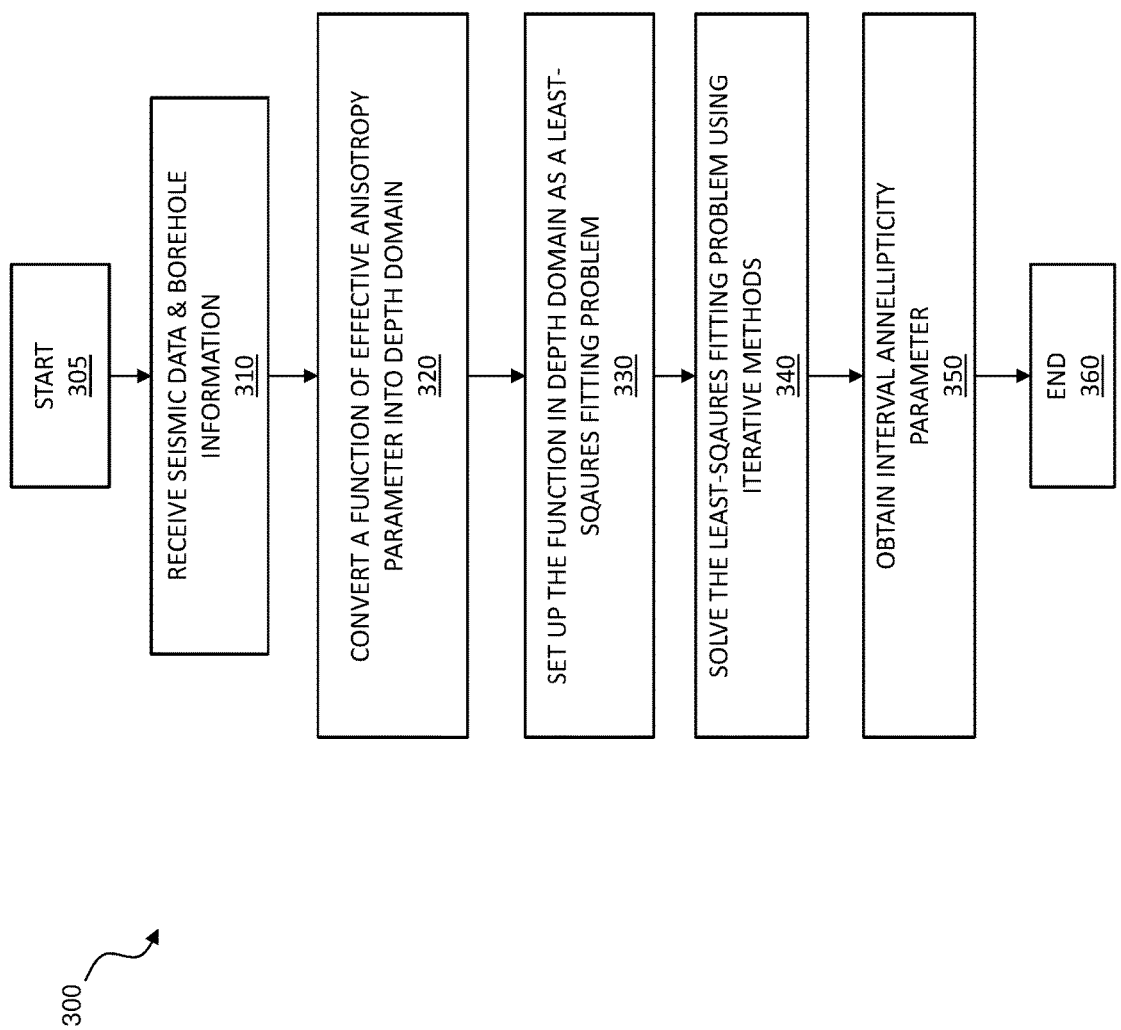
FIG. 3 is a flow diagram for a method of estimating interval anisotropy parameter.

Now turning to FIG. 3, illustrated is a flowchart for illustrating a method 300 for estimating an interval anellipticity parameter. The method 300 can be performed by a computer program product that corresponds to an algorithm that estimates an interval anellipticity parameter as disclosed herein. The method 300 may be carried out by an apparatus such as the interval anellipticity estimator 200 described in FIG. 2. The method begins in a step 305.

In a step 310, seismic data and borehole information are received. The received seismic data can be preprocessed for extracting measured effective anellipticity parameter, vertical information such as vertical velocity and vertical travel time, and a prior knowledge of interval normal moveout velocity.

In a step 320, a Dix-type equation that states the linear relationship between an effective anellipticity parameter and an interval anellipticity parameter is converted into depth domain. A rearranged Dix-type equation in depth domain is set up as a least-squares fitting problem based on the measured effective anellipticity parameter in a step 330. A step 340 employs an iterative method to solve the least-squares fitting problem for an anisotropy model containing interval anellipticity parameter. Applicable iterative methods may include conjugate-gradients, Gaussian-Newton and LSQR. A prior knowledge of interval normal moveout velocity obtained from an isotropic tomography may be applied as constraints of the anisotropy model. In step 350, an anisotropy model containing interval anellipticity parameter is obtained from the solution of the least-squares fitting problem. The method 300 ends in a step 360.

FIG. 4A, FIG. 4B, FIG. 4C, and FIG. 4D illustrate numerical test results for comparing the disclosed least-squares method for estimating interval anellipticity parameters with a traditional method. The test results are based on a horizontally layered VTI model with blocky interval anellipticity parameters and P-wave vertical velocity linearly increasing with depth, i.e., $V_{p0}(z)=3.0(1+0.083z)$. The minimum vertical velocity is 3.0 km/s at the surface of the model and the maximum vertical velocity is 4.0 km/s at the depth of 4.0 km of the model. The synthetic effective anellipticity parameters are calculated using Eq. 1 and are then added with uniform distributed random noise. The x-axis in each figure is the interval anellipticity parameter eta and the y-axis is depth.

Figure 4D:
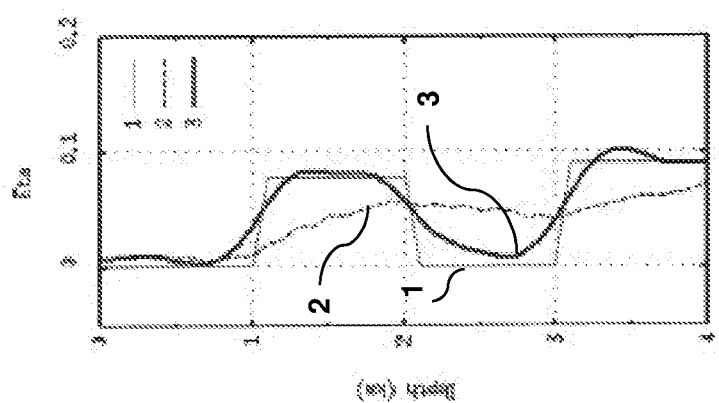
FIG. 4A, FIG. 4B, FIG. 4C, and FIG. 4D illustrate numerical test results for comparing the disclosed least-squares method for estimating interval anellipticity parameters with a traditional method.
Figure 4C:
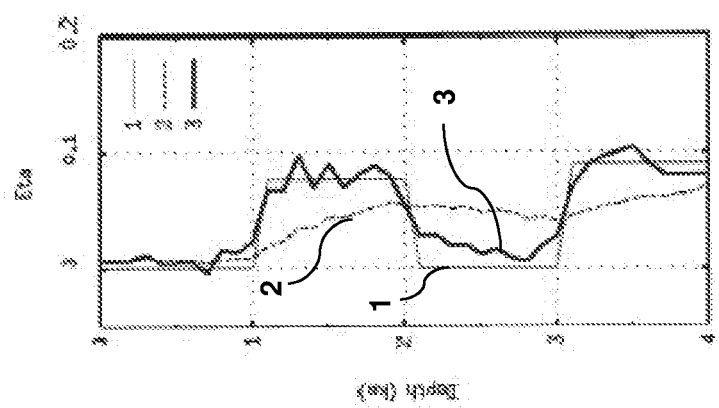
Figure 4B:
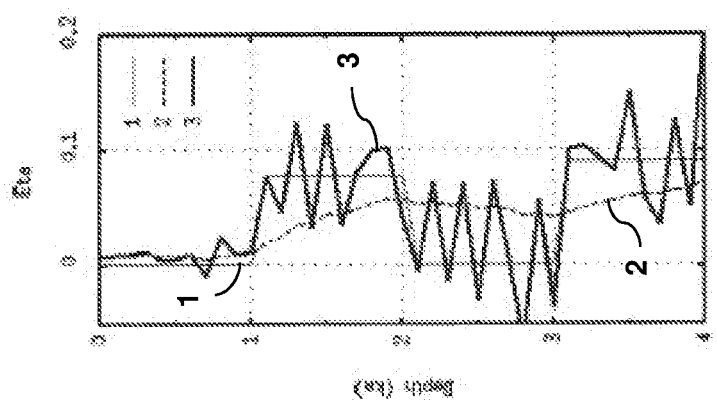
Figure 4A:
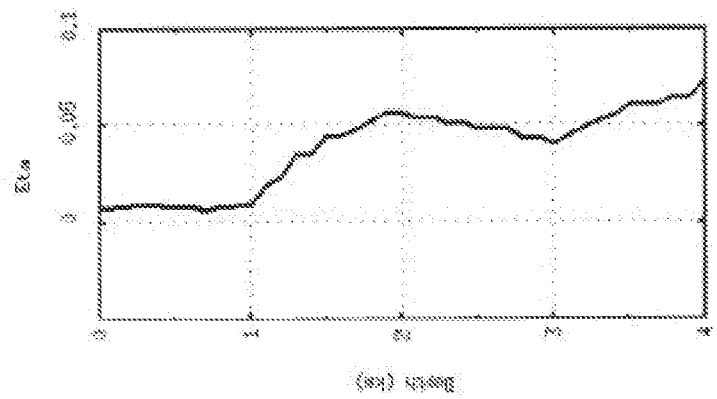

FIG. 4A shows the input data of effective anellipticity parameters with random noise used to invert for the interval anellipticity parameters. In FIGS. 4B, 4C and 4D, solid line 1 represents the true model, dashed line 2 represents the input effective anellipticity parameters, and solid line 3 represents the inversion result. FIG. 4B shows that traditional Dix-type inversion fails to recognize the noise and attenuate it. The estimates become unstable and deviate from the true model. In contrast, FIG. 4C shows the inversion result using the disclosed least-squares method. The result indicates that the resolved interval anellipticity parameters are comparable with those of the true model. However, it was observed that unexpected oscillations still exist in the inversion result. By applying the preconditioning to further constrain the problem, FIG. 4D shows a better result compared to the result in FIG. 4C, and shows great potential for estimating the reliable interval anisotropy parameters for PSDM using the disclosed least-squares method.

The above-described system, apparatus, and methods or at least a portion thereof may be embodied in or performed by various processors, such as digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods or functions of the system or apparatus described herein.

Certain embodiments disclosed herein can further relate to computer storage products with a non-transitory computer-readable medium that have program code thereon for performing various computer-implemented operations that embody the apparatuses, the systems or carry out the steps of the methods set forth herein. Non-transitory medium used herein refers to all computer-readable media except for transitory, propagating signals. Examples of non-transitory computer-readable medium include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Embodiments disclosed herein include:

A. An interval anellipticity parameter estimator for pre-stack depth migration (PSDM), including an interface configured to receive seismic data and borehole information, and a processor having a depth convertor configured to convert a function of an effective anellipticity parameter into depth domain based on the borehole information, an inverse transformer configured to set up the function of depth of the effective anellipticity parameter as a least-squares fitting problem based on the seismic data, and an iterative solver configured to use an iterative method to solve the least-squares fitting problem for an anisotropy model containing an interval anellipticity parameter.

B. A method for estimating interval anellipticity parameter in the depth domain for pre-stack depth migration (PSDM) including obtaining a function of depth of effective anellipticity parameter based on borehole information, transforming the function of depth of effective anellipticity parameter as a least-squares fitting problem based on seismic data associated with the borehole information, and obtaining, by a processor an anisotropy model containing an interval anellipticity parameter in the depth domain by solving the least-squares fitting problem.

C. A computer program product having a series of operating instructions stored on a non-transitory computer readable medium that direct the operation of a processor when initiated to perform a method of directly inverting an effective anellipticity parameter to obtain an interval anellipticity parameter as a function of depth, the method including obtaining a function of depth of effective anellipticity parameter based on borehole information, transforming the function of depth of effective anellipticity parameter as a least-squares fitting problem based on seismic data, and obtaining an anisotropy model containing an interval anellipticity parameter by solving the least-squares fitting problem.

Each of embodiments A, B, and C may have one or more of the following additional elements in combination:

Element 1: wherein the iterative solver employs vertical velocity, vertical travel time and other vertical information from the borehole information to solve the least-squares fitting problem. Element 2: wherein the effective anellipticity parameter is obtained from the seismic data and an interval normal moveout velocity is obtained from an isotropic tomography from the seismic data. Element 3: wherein the iterative solver is configured to constrain the anisotropy model based on the interval normal moveout velocity. Element 4: wherein the iterative method is conjugate-gradient. Element 5: wherein the function of depth of effective anisotropy parameter is a Dix-type equation and the effective anellipticity parameter is inverted for the interval anellipticity parameter as a function of depth. Element 6: wherein the seismic data is associated with a depth migration that uses a velocity model and the depth migration includes the PSDM. Element 7: obtaining vertical velocity, vertical travel time and other vertical information from the borehole information. Element 8: obtaining effective anellipticity parameter and interval normal move-out velocity from the seismic data. Element 9: constraining the anisotropy model based on the interval normal move-out velocity. Element 10: wherein the least-squares fitting problem is solved by a conjugate-gradient iterative method. Element 11: wherein the function of depth of effective anisotropy parameter is a Dix-type equation, wherein the effective anellipticity parameter is inverted for interval anellipticity parameter as a function of depth. Element 12: obtaining measured effective anellipticity parameter and interval normal move-out velocity from an isotropic tomography based on the seismic data. Element 13: wherein the least-squares fitting problem is solved employing an iterative method. Element 14: wherein the function of depth of effective anisotropy parameter is a Dix-type equation and the effective anellipticity parameter is inverted to obtain the interval anellipticity parameter.

What is claimed is:

1. An interval anellipticity parameter estimator for pre-stack depth migration (PSDM), comprising: an interface configured to receive seismic data and borehole information associated with a subterranean formation; and a processor having a depth convertor configured to convert a function of an effective anellipticity parameter, which is obtained from said seismic data, into depth domain based on said borehole information, an inverse transformer configured to set up said function of depth of said effective anellipticity parameter as a least-squares fitting problem based on said seismic data, and an iterative solver configured to use an iterative method to solve said least-squares fitting problem for an anisotropy model containing an interval anellipticity parameter, wherein an interval normal moveout velocity is obtained from an isotropic tomography from said seismic data and is applied as a constraint of said anisotropy model; wherein said processor is further configured to generate depth images of said subterranean formation by performing a depth migration using said interval anellipticity parameter.

2. The interval anellipticity parameter estimator of claim 1, wherein said iterative solver employs vertical velocity, vertical travel time and other vertical information from said borehole information to solve said least-squares fitting problem.

3. The interval anellipticity parameter estimator of claim 1, wherein said iterative method is conjugate-gradient.

4. The interval anellipticity parameter estimator of claim 1, wherein said function of depth of said effective anellipticity parameter is a Dix-type equation and said effective anellipticity parameter is inverted for said interval anellipticity parameter as a function of depth.

5. The interval anellipticity parameter estimator of claim 1, wherein said seismic data is associated with said depth migration that uses a velocity model and said depth migration includes said PSDM.

6. A method for estimating interval anellipticity parameter in the depth domain for pre-stack depth migration (PSDM), comprising: obtaining an effective anellipticity parameter and an interval normal move-out velocity from seismic data associated with a subterranean formation; obtaining a function of depth of said effective anellipticity parameter based on borehole information; transforming said function of depth of said effective anellipticity parameter as a least-squares fitting problem based on said seismic data; obtaining, by a processor, an anisotropy model containing an interval anellipticity parameter in the depth domain by solving said least-squares fitting problem; constraining said anisotropy model based on said interval normal move-out velocity; and generating depth images of said subterranean formation by performing a depth migration using said interval anellipticity parameter.

7. The method of claim 6, further comprising obtaining vertical velocity, vertical travel time and other vertical information from said borehole information.

8. The method of claim 6, wherein said least-squares fitting problem is solved by a conjugate-gradient iterative method.

9. The method of claim 6, wherein said function of depth of said effective anellipticity parameter is a Dix-type equation, wherein said effective anellipticity parameter is inverted for interval anellipticity parameter as a function of depth.

10. The method of claim 6, wherein said seismic data is associated with said depth migration that uses a velocity model and said depth migration includes said PSDM.

11. A computer program product having a series of operating instructions stored on a non-transitory computer readable medium that direct the operation of a processor when initiated to perform a method of directly inverting an effective anellipticity parameter to obtain an interval anellipticity parameter as a function of depth, the method comprising: obtaining an effective anellipticity parameter and an interval normal move-out velocity from an isotropic tomography based on seismic data associated with a subterranean formation; obtaining a function of depth of said effective anellipticity parameter based on borehole information; transforming said function of depth of said effective anellipticity parameter as a least-squares fitting problem based on said seismic data; obtaining an anisotropy model containing an interval anellipticity parameter by solving said least-squares fitting problem; constraining said anisotropy model based on said interval normal move-out velocity; and generating depth images of said subterranean formation by performing a depth migration using said interval anellipticity parameter.

12. The computer program product of claim 11, further comprising obtaining vertical velocity, vertical travel time and other vertical information from said borehole information.

13. The computer program product of claim 11, wherein said least-squares fitting problem is solved employing an iterative method.

14. The computer program product of claim 11, wherein said function of depth of said effective anellipticity parameter is a Dix-type equation and said effective anellipticity parameter is inverted to obtain said interval anellipticity parameter.

* * * * *